United States Patent
Matsui et al.

(10) Patent No.: US 11,631,901 B2
(45) Date of Patent: Apr. 18, 2023

(54) BATTERY, BATTERY PACK, ELECTRONIC DEVICE, ELECTRIC VEHICLE, ELECTRIC STORAGE DEVICE, AND ELECTRIC POWER SYSTEM

(71) Applicant: MURATA MANUFACTURING CO., LTD., Kyoto (JP)

(72) Inventors: Takaaki Matsui, Kyoto (JP); Hiroto Asano, Kyoto (JP); Moriaki Okuno, Kyoto (JP); Yoshimi Tokuhara, Kyoto (JP); Aya Hashimoto, Kyoto (JP); Taichi Kogure, Kyoto (JP); Naoko Yamakawa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 711 days.

(21) Appl. No.: 16/001,014

(22) Filed: Jun. 6, 2018

(65) Prior Publication Data
US 2018/0287215 A1    Oct. 4, 2018

Related U.S. Application Data

(63) Continuation of application No. PCT/JP2016/005051, filed on Dec. 2, 2016.

(30) Foreign Application Priority Data

Dec. 14, 2015 (JP) .............................. JP2015-243423

(51) Int. Cl.
*H01M 10/04* (2006.01)
*H01M 6/10* (2006.01)
(Continued)

(52) U.S. Cl.
CPC ......... *H01M 10/0587* (2013.01); *B60L 50/64* (2019.02); *B60L 53/22* (2019.02);
(Continued)

(58) Field of Classification Search
CPC ......... H01M 10/0587; H01M 10/0431; H01M 10/052; H01M 10/0525; H01M 10/425;
(Continued)

(56) References Cited

U.S. PATENT DOCUMENTS

| | | | | |
|---|---|---|---|---|
| 4,053,687 A | * | 10/1977 | Coibion ................. | H01M 6/10 429/174 |
| 2003/0134200 A1 | * | 7/2003 | Tanaka .................. | H01M 4/485 429/231.95 |

(Continued)

FOREIGN PATENT DOCUMENTS

| CN | 101364644 | 2/2009 |
|---|---|---|
| CN | 103151553 | 6/2013 |

(Continued)

OTHER PUBLICATIONS

Norvarials Product Literature LiCoO2 {http://www.novarials.com/ProductsLiCoO2LIB.html} (C) 2014—considered Dec. 2014.*

(Continued)

*Primary Examiner* — Cynthia H Kelly
*Assistant Examiner* — Julian Anthony
(74) *Attorney, Agent, or Firm* — K&L Gates LLP

(57) ABSTRACT

A battery is provided. The battery includes an electrode having a flat shape. The electrode is wound and includes a through hole. The through hole is further provided in a wound-back portion of the electrode.

14 Claims, 7 Drawing Sheets

(51) Int. Cl.
*H01M 10/42* (2006.01)
*H01M 50/538* (2021.01)
*H01M 10/28* (2006.01)
*H01M 10/0587* (2010.01)
*B60L 50/64* (2019.01)
*B60L 53/22* (2019.01)
*H01M 10/44* (2006.01)
*H01M 10/052* (2010.01)
*H01M 4/131* (2010.01)
*H01M 10/0525* (2010.01)
*H01M 4/04* (2006.01)
*H02J 7/35* (2006.01)
*H01M 4/02* (2006.01)
*H02J 7/00* (2006.01)

(52) U.S. Cl.
CPC ....... *H01M 4/131* (2013.01); *H01M 10/0431* (2013.01); *H01M 10/052* (2013.01); *H01M 10/0525* (2013.01); *H01M 10/425* (2013.01); *H01M 10/441* (2013.01); H01M 4/0404 (2013.01); H01M 2004/021 (2013.01); H01M 2004/028 (2013.01); H01M 2010/4271 (2013.01); H01M 2220/20 (2013.01); H02J 7/0013 (2013.01); H02J 7/35 (2013.01); Y02E 60/10 (2013.01); Y02T 10/70 (2013.01)

(58) Field of Classification Search
CPC ..... H01M 10/441; H01M 4/131; B60L 53/22; B60L 50/64
See application file for complete search history.

(56) References Cited

U.S. PATENT DOCUMENTS

| | | | | |
|---|---|---|---|---|
| 2007/0202401 A1* | 8/2007 | Viavattine | ............... | H01M 6/14 429/209 |
| 2008/0248375 A1* | 10/2008 | Cintra | ............... | H01M 10/0587 429/94 |
| 2010/0310924 A1 | 12/2010 | Kaneda et al. | | |
| 2012/0326500 A1* | 12/2012 | Hirose | ................. | H01M 4/485 307/9.1 |
| 2014/0329117 A1* | 11/2014 | Kubota | ............. | H01M 10/0431 429/66 |
| 2015/0179998 A1* | 6/2015 | Kagami | ................. | B60L 53/65 429/246 |
| 2017/0047559 A1* | 2/2017 | Yoo | ................... | H01M 10/0525 |

FOREIGN PATENT DOCUMENTS

| | | | | |
|---|---|---|---|---|
| JP | 2002-343340 | * | 11/2002 | ........... H01M 10/05 |
| JP | 2010-080427 A | | 4/2010 | |
| JP | 2013-098026 | | 5/2013 | |
| JP | 2013-134861 A | | 7/2013 | |
| JP | 2013-134861 | | 8/2013 | |
| JP | 2013-171733 | | 9/2013 | |
| JP | 2015-005481 | | 1/2015 | |
| WO | 2015/107893 A1 | | 7/2015 | |

OTHER PUBLICATIONS

JP 2002-343340 Espacenet Abstract Nov. 29, 2002.*
JP 2002-343340 Espacenet English machine translatin Nov. 29, 2002.*
Japanese Office Action dated Mar. 24, 2020 in corresponding Japanese Application No. 2015-243423.
International Search Report and Written Opinion issued in connection with International Patent Application No. PCT/JP2016/005051, dated Mar. 7, 2017. (9 pages).
Japanese Office Action dated Jan. 8, 2019 in corresponding Japanese Application No. 2015-243423.
Chinese Office Action dated Sep. 29, 2020 in corresponding Chinese Application No. 201680068495.9.
Chinese Search Report dated Dec. 2, 2016 in corresponding Chinese Application No. 201680068495.9.
Japanese Office Action dated Aug. 13, 2019 in corresponding Japanese Application No. 2015-243423.

* cited by examiner

BATTERY, BATTERY PACK, ELECTRONIC DEVICE, ELECTRIC VEHICLE, ELECTRIC STORAGE DEVICE, AND ELECTRIC POWER SYSTEM

CROSS REFERENCE TO RELATED APPLICATIONS

The present application is a continuation of PCT patent application no. PCT/JP2016/005051, filed on Dec. 2, 2016, which claims priority to Japanese patent application no. JP2015-243423 filed on Dec. 14, 2015, the entire contents of which are being incorporated herein by reference.

BACKGROUND

The present technology generally relates to a battery, a battery pack, an electronic device, an electric vehicle, an electric storage device, and an electric power system.

In recent years, various electronic devices such as mobile phones and personal digital assistants (Personal Digital Assistants: PDA) have been widely diffused, and there has been demand for further reduction in electronic device size. In response to this demand, the development of high energy density batteries as power sources has been advanced.

Technology for the achievement of the increase in energy density includes an approach of increasing the film thickness of an electrode to improve the area density of an active material layer. However, when this technique is adopted for a wound battery element, there is a possibility that the electrode may be fractured in the wound-back portion.

For this reason, approaches have been studied which can maintain the winding property even in the case of a thick electrode with a high area density, by controlling the strength and elongation of a current collector or adopting a highly flexible binder.

SUMMARY

The present technology generally relates to a battery, a battery pack, an electronic device, an electric vehicle, an electric storage device, and an electric power system.

According to an embodiment of the present technology, a battery is provided. The battery includes an electrode having a flat shape. The electrode is wound and includes a through hole. The through hole is provided in a wound-back portion of the electrode.

According to another embodiment of the present technology, a battery pack is provided. The battery pack includes the battery according to the embodiment as described herein, and a control circuit configured to control the battery.

An electronic device, in an embodiment, includes the battery according to the embodiment as described herein, where the device is configured to receive power supply from the battery.

According to an embodiment, an electric vehicle is provided and includes the battery according to the embodiment as described herein, a conversion device configured to receive power supply from the battery to convert the power to a driving force for the vehicle, and a control device configured to perform information processing related to vehicle control, based on information on the battery.

According to an embodiment, an electric storage device is provided and includes the battery according to the embodiment as described herein, where the electric storage device is configured to supply electric power to an electronic device connected to the battery.

According to another embodiment, a power system is provided and includes the battery according to the embodiment as described herein, where the power system is configured to receive power supply from the battery.

As described herein, according to an embodiment of the present technology, fracture of the electrode can be suppressed. Similar effects can be achieved in the battery pack, the electronic device, the electric vehicle, the electric storage device, and the electric power system of the present technology using the battery according to an embodiment. It should be understood that the present technology is not limited to suppress fracture of the electrode and that other suitable properties relating to the present technology may be realized and as further described herein.

DETAILED DESCRIPTION

The present technology generally relates to a battery, a battery pack, an electronic device, an electric vehicle, an electric storage device, and an electric power system. The present disclosure will be described based on examples with reference to the drawings, but the present disclosure is not to be considered limited to the examples, and various numerical values and materials in the examples are considered by way of example.)

Figure 1:
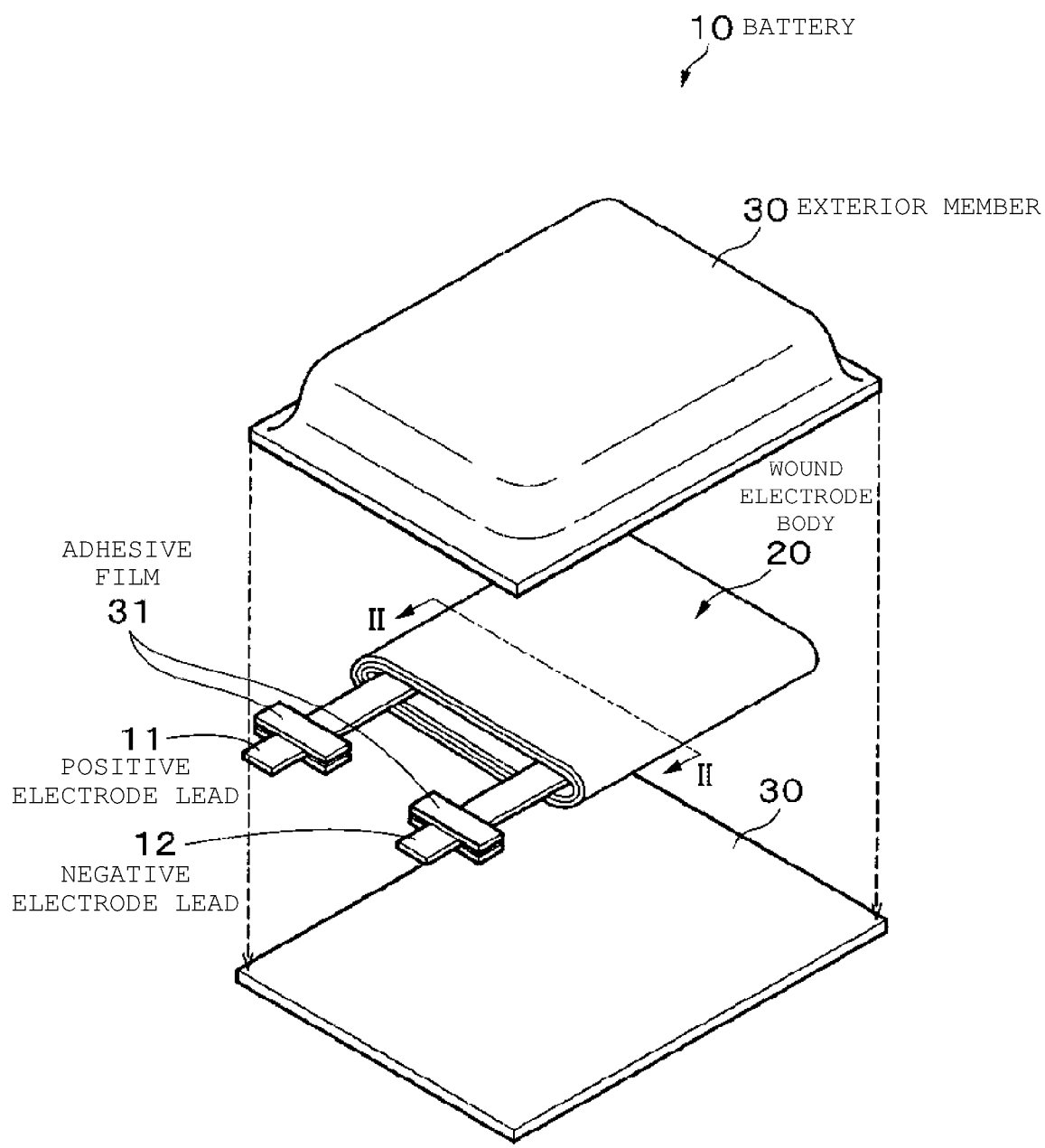
FIG. 1 is an exploded perspective view illustrating a configuration example of a nonaqueous electrolyte secondary battery according to an embodiment of the present technology.

As shown in FIG. 1, a nonaqueous electrolyte secondary battery (hereinafter referred to simply as a "battery") 10 according to an embodiment of the present technology is a so-called laminate film-type battery, where a flattened wound electrode body 20 with a positive electrode lead 11 and a negative electrode lead 12 attached thereto is housed in a film-like exterior member 30, thereby allowing for the reduction in size, the reduction in weight, and the reduction in thickness.

The positive electrode lead 11 and the negative electrode lead 12 are each led out from the inside of the exterior member 30 toward the outside, for example, in the same direction. Each of the positive electrode lead 11 and the negative electrode lead 12 includes, for example, a metal material such as aluminum (Al), copper (Cu), nickel (Ni), or stainless steel, and adapted to have the form of a thin plate or mesh.

The exterior member 30 includes, for example, a flexible laminate film according to an embodiment. The exterior member 30 is configured to have, for example, a heat-sealing resin layer, a metal layer, and a surface protection layer sequentially laminated. It should be understood that the surface on the heat-sealing resin layer side serves as the surface on which the wound electrode body 20 is housed. Examples of the material for the heat-sealing resin layer include polypropylene (PP) and polyethylene (PE). Examples of the material for the metal layer include, for example, aluminum. Examples of the material for the surface protection layer include, for example, nylon (Ny). Specifically, for example, the exterior member 30 is composed of, for example, a rectangular aluminum laminate film consisting of a nylon film, an aluminum foil, and a polyethylene film bonded to each other in this order. The exterior member 30 is provided, for example, such that the polyethylene film side and the wound electrode body 20 are opposed to each other, and respective outer edges thereof are attached firmly to each other by fusion bonding or with an adhesive. Between the exterior member 30 and the positive electrode lead 11 and the negative electrode lead 12, an adhesive film 31 for preventing the intrusion of outside air is inserted. The adhesive film 31 includes a material that has adhesiveness to the positive electrode lead 11 and the negative electrode lead 12, for example, a polyolefin resin such as polyethylene, polypropylene, modified polyethylene, or modified polypropylene.

It should be understood that the exterior member 30 may include a laminate film that has another structure, a polymer film such as polypropylene, or a metal film, instead of the above-described laminate film. Alternatively, a laminate film may be used which has a polymer film laminated on one or both sides of an aluminum film as a core material.

In addition, from the viewpoint of aesthetic aspect, a member further including a coloring layer and/or a member with a coloring material included in at least one layer selected from a heat-sealing resin layer and a surface protection layer may be used as the exterior member 30. When an adhesive layer is provided at least one of between the heat-sealing resin layer and the metal layer and between the surface protection layer and the metal layer, the adhesive layer may be adapted to include a coloring material.

Figure 2:
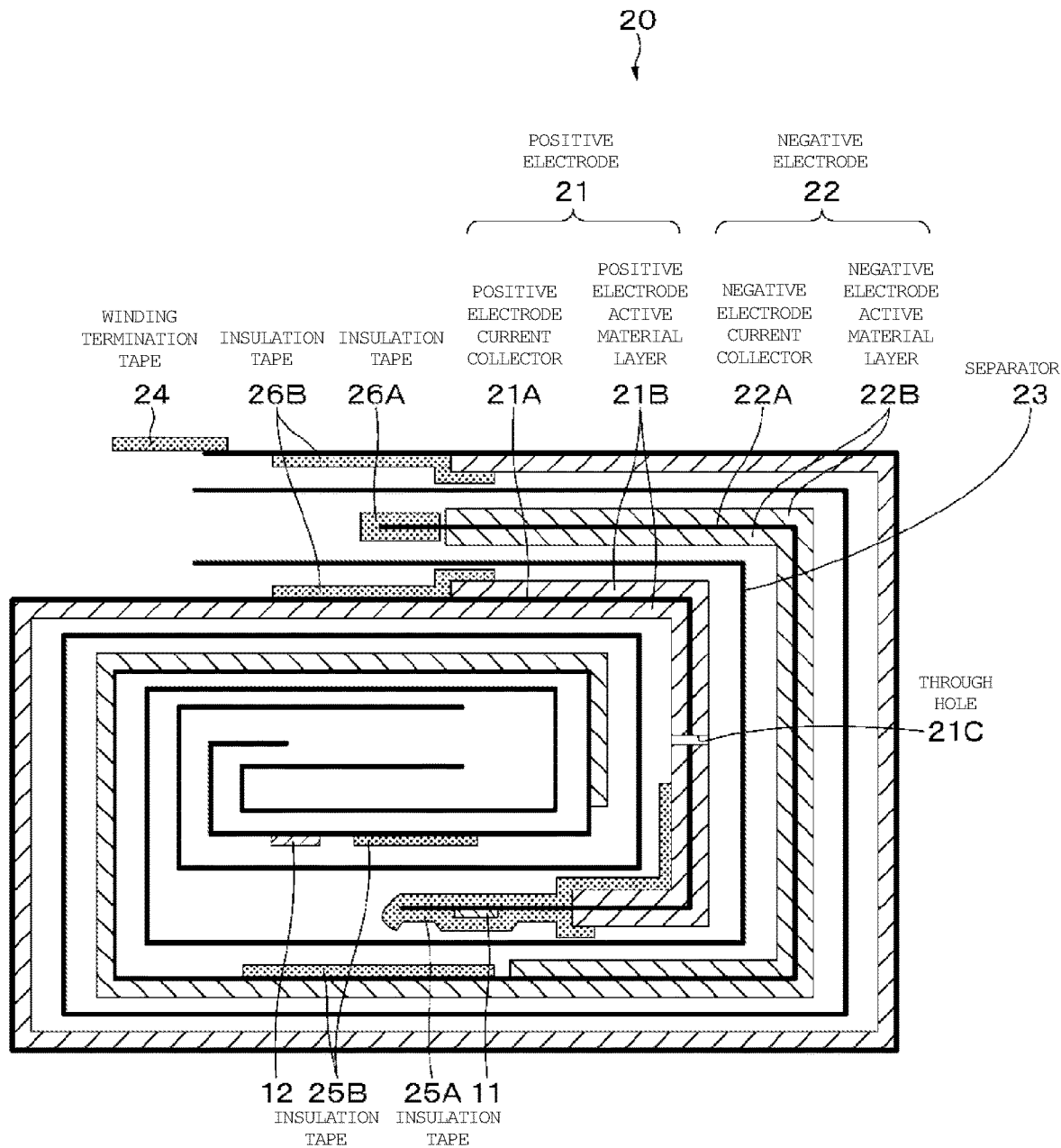
FIG. 2 is a cross-sectional view of a wound electrode body taken along the line II-II of FIG. 1 according to an embodiment.

As shown in FIG. 2, the wound electrode body 20 as a battery element is configured such that elongated positive and negative electrodes 21 and 22 are stacked with a similarly elongated separator 23 interposed therebetween, and wound into a flattened shape according to an embodiment. An electrolytic solution as an electrolyte is injected into the exterior member 30 and the positive electrode 21, the negative electrode 22, and the separator 23 are impregnated with the electrolytic solution. The wound electrode body 20 is wound such that the negative electrode 22 serves as the innermost peripheral electrode, whereas the positive electrode 21 serves as the outermost peripheral electrode. The outermost circumferential end of the positive electrode 21 is fixed with a winding termination tape 24. The inner circumferential end of the positive electrode 21 is provided with an insulation tape 25A, and an insulation tape 25B is provided on the negative electrode 22 opposed to the inner circumferential end of the positive electrode 21. The outer circumferential end of the negative electrode 22 is provided with an insulation tape 26A, and an insulation tape 26B is provided on the positive electrode 21 opposed to the outer circumferential end of the negative electrode 22.

The positive electrode 21, the negative electrode 22, the separator 23, and the electrolyte included in the battery will be sequentially described below.

The positive electrode 21 has a structure with a positive electrode active material layer 21B provided on both surfaces of a positive electrode current collector 21A. It should be understood that the positive electrode active material layer 21B may be provided only on one surface of the positive electrode collector 21A according to an embodiment.

The positive electrode 21 has one or more through holes 21C in the wound-back portion. In this regard, the wound-back portion with the through hole 21C refers to a wound-back portion of the positive electrode 21 where the positive electrode active material layer 21B is provided on one or both surfaces of the positive electrode collector 21A according to an embodiment.

Figure 3:
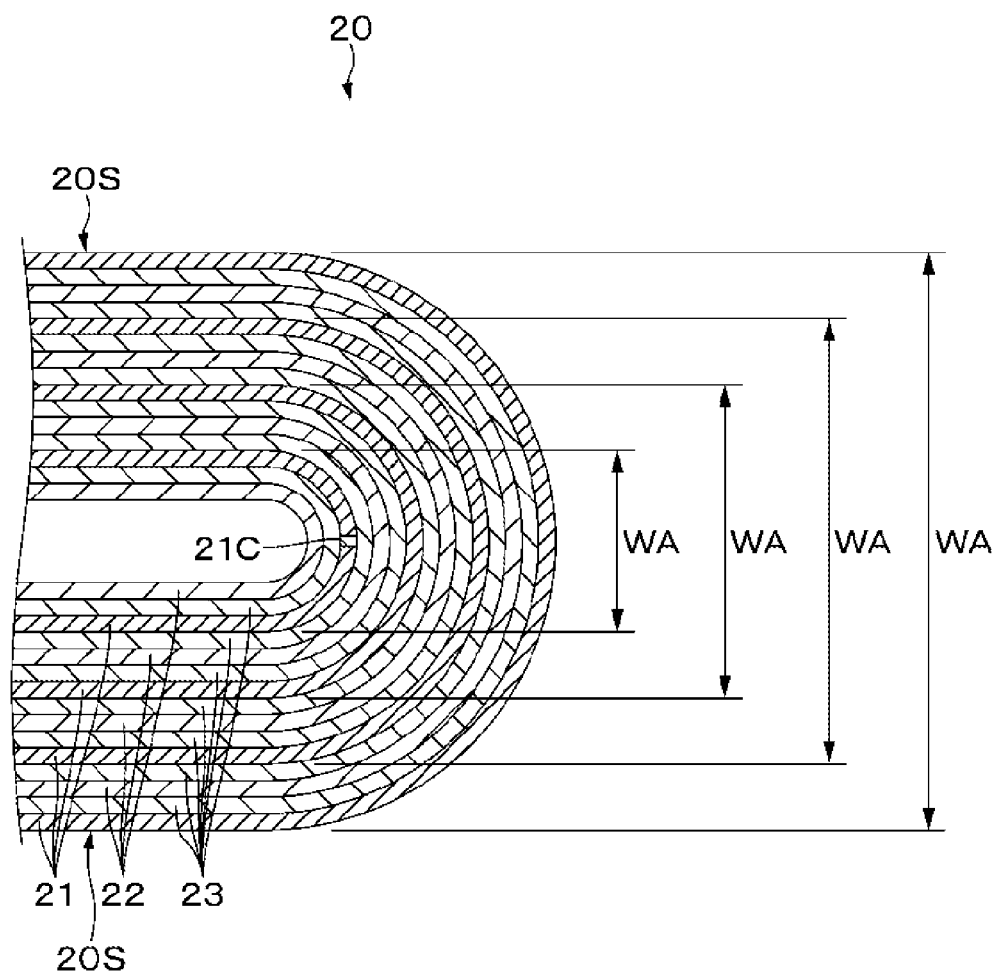
FIG. 3 is a cross-sectional view for explaining a wound-back portion of the wound electrode body according to an embodiment.

In this specification, the wound-back portion of the positive electrode 21 refers to a curved part of the wound positive electrode 21 located between flat parts 20S thereof as shown in FIG. 3. The width WA of the wound-back portion in the thickness direction of the wound electrode body 20 becomes narrower from the outer circumferential side of the wound electrode body 20 toward the inner circumferential side thereof, and substantially linear at the innermost circumference of the positive electrode 21. For this reason, the stress applied to the wound-back portion is increased from the outer circumferential side of the wound electrode body 20 toward the inner circumferential side thereof, and the stress is concentrated on the substantially linear wound-back portion at the innermost circumference of the positive electrode 21.

The through hole 21C is preferably provided in the wound-back portion of the positive electrode 21 at the innermost circumference of the positive electrode active material layer 21B. This is because, since stress is likely to be concentrated on the wound-back portion at the innermost circumference of the positive electrode active material layer 21B, there is a possibility that the positive electrode 21 will be likely to be fractured, unless the through hole 21C is provided.

The through hole 21C is more preferably provided in the first wound-back portion of the positive electrode active material layer 21B of the positive electrode 21. This is because, since stress is likely to be concentrated, in particular, on the first wound-back portion of the positive electrode active material layer 21B, there is a possibility that the positive electrode 21 will be likely to be fractured, unless the through hole 21C is provided. According to an embodiment, the first wound-back portion may refer to a portion of the innermost circumference of the positive electrode active material layer 21 B of.

The through hole 21C is preferably further provided in the wound-back portion of the second turn of the positive electrode active material layer 21B of the positive electrode 21. This is because, since stress is next likely, after the wound part of the innermost circumference (the first turn) of the positive electrode active material layer 21B, to be concentrated on the wound-back portion of the second turn of the positive electrode active material layer 21B next to the innermost circumference, there is a possibility that the positive electrode 21 will be likely to be fractured, unless the through hole 21C is provided.

The through hole 21C is preferably provided at the top of the wound-back portion of the positive electrode 21. This is because, since stress is likely to be concentrated on the top surface of the wound-back portion, there is a possibility that the positive electrode 21 will be likely to be fractured, unless the through hole 21C is provided. It is preferable to provide the through hole 21C at the top surface of the innermost circumferential wound-back portion, and it is more preferable to provide the through hole 21C at the top surface of the first wound-back portion. In addition to the top surface of the innermost circumferential wound-back portion, the second turn of wound-back portion may be also provided with the through hole 21C according to an embodiment.

The through hole 21C has, for example, a circular shape, an elliptical shape, an oval shape, a polygonal shape, or an irregular shape as viewed from the thickness direction of the positive electrode 21. When the positive electrode 21 has a plurality of through holes 21C in the wound-back portion, the through holes 21C may have different shapes. In addition, the through holes 21C may be differ in size according to an embodiment.

Figure 4A:
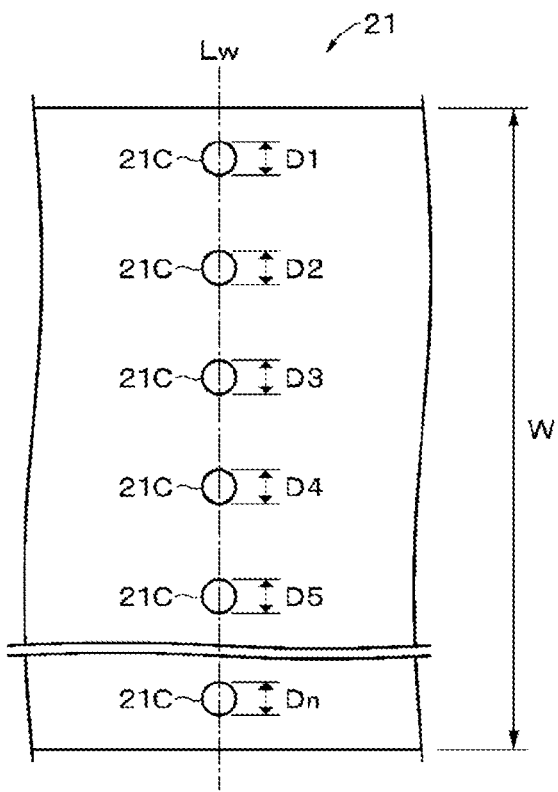
FIGS. 4A and 4B are schematic diagrams for explaining arrangement examples of through holes according to an embodiment.
Figure 4B:
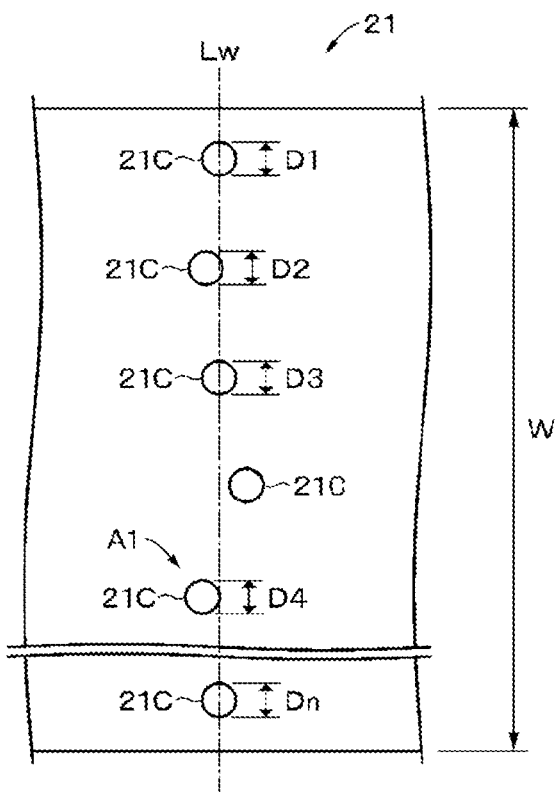

When the positive electrode 21 has a plurality of through holes 21C in the wound-back portion, the plurality of through holes 21C may be linearly arranged in the lateral direction (width direction) or longitudinal direction of the positive electrode 21 (see FIG. 4A), or arranged to fluctuate in position with respect to the lateral direction or longitudinal direction of the positive electrode 21 (see FIG. 4B). The interval between adjacent through holes 21C may be constant, or may be changed according to an embodiment.

The area density of the positive electrode active material layer 21B in the section where the positive electrode active material layer 21B is provided on both surfaces of the positive electrode current collector 21A (hereinafter referred to simply as "the area density of the positive electrode active material layer 21B") is preferably more than 27 mg/cm$^2$ and less than 65 mg/cm$^2$, more preferably 39 mg/cm$^2$ or more and 60 mg/cm$^2$ or less. When the area density is 27 mg/cm$^2$ or less, the wound-back portion of the positive electrode 21 is less likely to be fractured during the manufacture of the battery 10, even without providing the through hole 21C in the wound-back portion of the positive electrode 21. On the other hand, when the density exceeds 65 mg/cm$^2$, there is a possibility that the wound-back portion of the positive electrode 21 will be fractured during the manufacture of the battery 10, even if the through hole 21C is provided in the wound-back portion of the positive electrode 21 according to an embodiment.

The area density of the positive electrode active material layer 21B is determined in the following way. First, the battery discharged to the specified voltage is disassembled, and the positive electrode 21 is removed and dried. Next, a positive electrode piece is obtained by selecting a section of the positive electrode 21 where the positive electrode active material layer 21B is provided on both surfaces of the positive electrode current collector 21A (for example, a middle section of the positive electrode 21) is selected, and punching the section into a circular shape. Next, the mass of the positive electrode piece is measured with an electronic balance, and the thickness of the positive electrode piece is measured with a height meter. Next, the positive electrode active material layer 21B of the positive electrode piece is dissolved in a solvent such as N-methyl-2-pyrrolidone (NMP) or dimethyl carbonate (DMC), and thus removed to obtain a positive electrode current collector piece. Next, the mass and thickness of the positive electrode current collector piece are measured in the same manner as the positive electrode piece. Next, the area density of the positive electrode active material layer 21B is obtained with the use of the following formula.

Area Density [g/cm$^3$]=(Mass of Positive Electrode Piece [g]−Mass of Positive Electrode Current Collector Piece [g])/Area of Positive Electrode Piece [cm$^2$]

However, the area [cm$^2$] of the positive electrode piece is the area of a circular main surface of the positive electrode piece.

The volume density of the positive electrode active material layer 21B is preferably more than 3.0 g/cm$^3$ and 4.30 g/cm$^3$ or less, more preferably 3.2 g/cm$^3$ or more and 4.30 g/cm$^3$ or less. When the volume density is 3.0 mg/cm$^3$ or less, the wound-back portion of the positive electrode 21 is less likely to be fractured during the manufacture of the battery 10, even without providing the through hole 21C in the wound-back portion of the positive electrode 21. On the other hand, when the volume density exceeds 4.30 g/cm$^3$, there is a possibility that the wound-back portion of the positive electrode 21 will be fractured during the manufacture of the battery 10, even if the through hole 21C is provided in the wound-back portion of the positive electrode 21 according to an embodiment.

The volume density of the positive electrode active material layer 21B is determined in the following way. First, the battery discharged to the specified voltage is disassembled, and the positive electrode 21 is removed and dried. Next, the positive electrode 21 is punched into a circular shape to obtain a positive electrode piece. Next, the mass of the positive electrode piece is measured with an electronic balance, and the thickness of the positive electrode piece is measured with a height meter. Next, the positive electrode active material layer 21B of the positive electrode piece is dissolved in a solvent such as N-methyl-2-pyrrolidone (NMP) or dimethyl carbonate (DMC), and thus removed to obtain a positive electrode current collector piece. Next, the mass and thickness of the positive electrode current collector piece are measured in the same manner as the positive electrode piece. Next, the volume density of the positive electrode active material layer 21B is obtained with the use of the following formula.

Volume Density [g/cm$^3$]=(Mass of Positive Electrode Piece [g]−Mass of Positive Electrode Current Collector Piece [g])/(Area of Positive Electrode Piece [cm$^2$]×(Thickness of Positive Electrode Piece [cm]−Thickness of Positive Electrode Current Collector Piece [cm]))

However, the area [cm$^2$] of the positive electrode piece is the area of a circular main surface of the positive electrode piece.

The number of the through holes 21C provided in the wound-back portion is 1 or more and 15 or less according to an embodiment. When the number of the through holes 21C is 15 or less, fracture of the positive electrode 21 can be suppressed which is generated in the wound-back portion when a charge/discharge cycle is repeated according to an embodiment.

The hole diameter of the through hole 21C is preferably larger than 0 μm and 1500 μm or less, more preferably 5 μm or more and 1500 μm or less according to an embodiment. When the hole diameter of the through hole 21C is 1500 μm or less, fracture of the positive electrode 21 can be suppressed which is generated in the wound-back portion when a charge/discharge cycle is repeated. When the hole diameter is 5 μm or more, the through hole 21C can be formed with the use of a common device. However, the hole diameter of the through hole 21C means the diameter of the through hole 21C when the through hole 21C has a circular shape, and means the maximum crossing length of the through hole 21C when the through hole 21C has a shape other than the circular shape according to an embodiment.

The hole diameter of the through hole 21C is determined in the following way. First, the through hole 21C is observed with an optical microscope or a scanning electron microscope (Scanning Electron Microscope, hereinafter referred to as "SEM"), and the hole diameter of the through hole 21C is determined from the observed image.

The occupancy rate of the through hole 21C in the lateral direction of the positive electrode 21 is preferably more than 0% and 24% or less. When the occupancy rate is 24% or less, fracture of the positive electrode 21 can be suppressed which is generated in the wound-back portion when a charge/discharge cycle is repeated.

The occupancy rate is determined in the following way. First, the width W of the positive electrode 21 in the lateral direction is measured. Next, the wound-back portion is observed with an optical microscope or a SEM.

As a result of the observation, when there is only one through hole 21C in the lateral direction of the positive electrode 21, the hole diameter D of the through hole 21C is measured, and the occupancy rate is determined from the following formula.

Occupancy Rate [%]=(Hole Diameter $D$ of One Through Hole 21C/Width $W$ in Lateral Direction of Positive Electrode 21)×100

As a result of the observation, as shown in FIG. 4A, when there are N (where N is an integer of 2 or more) through holes 21C in the lateral direction of the positive electrode 21, and when the centers of the N through holes 21C are located on an imaginary straight line Lw extending in the lateral direction of the positive electrode 21, the respective hole diameters D1, D2, . . . , Dn of the N through-holes 21C located on the imaginary straight line Lw are measured in the observed image. Next, these hole diameters D1, D2, . . . , Dn are added up to obtain the total sum $D_{SUM}$ of the hole diameters of the N through holes 21C. Next, the occupancy rate is determined from the following formula.

Occupancy Rate [%]=(Total Sum $D_{SUM}$ of Hole Diameters of $N$ Through Holes 21C/Width $W$ in Lateral Direction of Positive Electrode 21)×100

As a result of observation, as shown in FIG. 4B, when there are N through holes 21C in the lateral direction of the positive electrode 21, and when the N through holes 21C fluctuate in center position in the longitudinal direction of the positive electrode 21, an imaginary straight line Lw is assumed that passes through the largest number of through holes 21C in the observed image. In this regard, the imaginary straight line Lw is an imaginary straight line extending in the lateral direction of the positive electrode 21 as described above. It is to be noted that the state of passing through the through holes 21C is considered to include a state in contact with the through hole 21C (see "the through hole 21C indicated by an arrow A1" in FIG. 4B). Next, after measuring the respective hole diameters D1, D2, . . . , Dn of the N through holes 21C through which the straight line Lw passes, the hole diameters D1, D2, . . . , Dn are added up to obtain the total sum $D_{SUM}$ of the hole diameters of the N through holes 21C. Next, the occupancy rate is determined from the following formula.

Occupancy Rate [%]=(Total Sum $D_{SUM}$ of Hole Diameters of $N$ Through Holes 21C/Width $W$ in Lateral Direction of Positive Electrode 21)×100

The positive electrode current collector 21A includes, for example, metal foil such as aluminum foil, nickel foil, or stainless steel foil according to an embodiment.

The positive electrode active material layer 21B includes, for example, a positive electrode active material capable of occluding and releasing lithium which is an electrode reactant. The positive electrode active material layer 21B may further contain an additive, if necessary. For example, at least one of a conducting agent and a binder can be used as the additive according to an embodiment.

As the positive electrode material capable of occluding and releasing lithium, a lithium-containing compound is suitable, for example, such as a lithium oxide, a lithium phosphorus oxide, a lithium sulfide or an interlayer compound containing lithium, and two or more thereof may be used in mixture. In order to increase the energy density, a lithium-containing compound containing lithium, a transition metal element, and oxygen (O) is preferred. Examples of such a lithium-containing compound include, for example, a lithium composite oxide that has a layered rock-salt type structure as represented by the formula (A), and a lithium composite phosphate that has an olivine-type structure as represented by the formula (B). The lithium-containing compound more preferably contains at least one selected from the group consisting of cobalt (Co), nickel, manganese (Mn), and iron (Fe) as the transition metal element. Examples of such a lithium-containing compound include, for example, a lithium composite oxide that has a layered rock-salt type structure as represented by the formula (C), the formula (D) or the formula (E), a lithium composite oxide that has a spinel-type structure as represented by the formula (F), and a lithium composite phosphate that has an olivine-type structure represented by the formula (G), and specifically, $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

$$Li_pNi_{(1-q-r)}Mn_qM1_rO_{(2-y)}X_z \quad (A)$$

(In the formula (A), M1 represents at least one element selected from Group 2 to Group 15 excluding nickel and manganese. X represents at least one of Group 16 elements and Group 17 elements excluding oxygen. p, q, y and z represent values within the ranges of 0≤p≤1.5, 0≤q≤1.0, 0≤r≤1.0, −0.10≤y≤0.20, and 0≤z≤0.2.)

$$Li_aM2_bPO_4 \quad (B)$$

(In the formula (B), M2 represents at least one element selected from Group 2 to Group 15 elements. a and b represent values within the ranges of 0≤a≤2.0 and 0.5≤b≤2.0.)

$$Li_fMn_{(1-g-h)}Ni_gM3_hO_{(2-j)}F_k \quad (C)$$

(In the formula (C), M3 represents at least one element from the group consisting of cobalt, magnesium (Mg), aluminum, boron (B), titanium (Ti), vanadium (V), chromium (Cr), iron, copper, zinc (Zn), zirconium (Zr), molybdenum (Mo), tin (Sn), calcium (Ca), strontium (Sr) and tungsten (W). f, g, h, j and k represent values within the ranges of 0.8≤f≤1.2, 0<g<0.5, 0≤h≤0.5, g+h<1, −0.1≤j≤0.2, and 0≤k≤0.1. It is to be noted that the composition of lithium varies depending on the state of charge/discharge, and the value of f represents a value in a fully discharged state.)

$$Li_mNi_{(1-n)}M4_nO_{(2-p)}F_q \quad (D)$$

(In the formula (D), M4 represents at least one from the group consisting of cobalt, manganese, magnesium, aluminum, boron, titanium, vanadium, chromium, iron, copper, zinc, molybdenum, tin, calcium, strontium and tungsten. m, n, p, and q represent values within the ranges of $0.8 \leq m \leq 1.2$, $0.005 \leq n \leq 0.5$, $-0.1 \leq p \leq 0.2$, and $0 \leq q \leq 0.1$. It is to be noted that the composition of lithium varies depending on the state of charge/discharge, and the value of m represents a value in a fully discharged state.)

$$Li_rCo_{(1-s)}M5_sO_{(2-t)}F_u \qquad (E)$$

(In the formula (E), M5 represents at least one from the group consisting of nickel, manganese, magnesium, aluminum, boron, titanium, vanadium, chromium, iron, copper, zinc, molybdenum, tin, calcium, strontium and tungsten. r, s, t and u represents values within the ranges of $0.8 \leq r \leq 1.2$, $0 \leq s < 0.5$, $-0.1 \leq t \leq 0.2$, and $0 \leq u \leq 0.1$. The composition of lithium varies depending on the state of charge and discharge, and the value of r represents the value in a fully discharged state.)

$$Li_vMn_{2-w}M6_wO_xF_y \qquad (F)$$

(In the formula (F), M6 represents at least one from the group consisting of cobalt, nickel, magnesium, aluminum, boron, titanium, vanadium, chromium, iron, copper, zinc, molybdenum, tin, calcium, strontium and tungsten. v, w, x and y represent values within the ranges $0.9 \leq v \leq 1.1$, $0 \leq w \leq 0.6$, $3.7 \leq x \leq 4.1$, and $0 \leq y \leq 0.1$. The composition of lithium varies depending on the state of charge and discharge, and the value of v represents the value in a fully discharged state.)

$$Li_zM7PO_4 \qquad (G)$$

(In the formula (G), M7 represents at least one from the group consisting of cobalt, manganese, iron, nickel, magnesium, aluminum, boron, titanium, vanadium, niobium (Nb), copper, zinc, molybdenum, calcium, strontium, tungsten and zirconium. z represents a value within the range $0.9 \leq z \leq 1.1$. The composition of lithium varies depending on the state of charge and discharge, and the value of z represents the value in a fully discharged state.)

In addition to the foregoing, other examples of the positive electrode material capable of occluding and releasing lithium also include inorganic compounds containing no lithium, such as $MnO_2$, $V_2O_5$, $V_6O_{13}$, NiS, and MoS.

The positive electrode material capable of occluding and releasing lithium may be any other than those mentioned above. In addition, two or more of the positive electrode materials exemplified above may be mixed in arbitrary combination.

For example, at least one selected from resin materials such as polyvinylidene fluoride (PVdF), polytetrafluoroethylene (PTFE), polyacrylonitrile (PAN), styrene butadiene rubber (SBR) and carboxymethyl cellulose (CMC), and copolymers mainly of the resin materials is used as the binder.

Examples of the conducting agent include, for example, carbon materials such as graphite, carbon black or Ketjen black, and one, or two or more thereof are used in mixture. Besides the carbon materials, a metal material, a conductive polymer material, or the like may be used as long as the material has conductivity.

The negative electrode 22 has a structure with a negative electrode active material layer 22B provided on both surfaces of the negative electrode current collector 22A, which is disposed so that the negative electrode active material layer 22B and the positive electrode active material layer 21B are opposed to each other. It is to be noted that the negative electrode active material layer 22B may be provided only on one surface of the negative electrode collector 22A.

The negative electrode current collector 22A is made from, for example, metal foil such as copper foil, nickel foil, or stainless steel foil.

The negative electrode active material layer 22B includes one, or two or more negative electrode active materials capable of occluding and releasing lithium. The negative electrode active material layer 22B may further contain an additive such as a binder and a conducting agent, if necessary according to an embodiment.

It should be understood that in this nonaqueous electrolyte battery, the electrochemical equivalent of the negative electrode 22 or the negative electrode active material is larger than the electrochemical equivalent of the positive electrode 21, and theoretically, lithium metal is preferably kept from being precipitated on the negative electrode 22 in the course of charging.

Examples of the negative electrode active material include, for example, carbon materials such as non-graphitizable carbon, graphitizable carbon, graphite, pyrolytic carbon, coke, glassy carbon, a fired body of organic polymer compound, carbon fibers, or activated carbon. Among the foregoing materials, examples of the coke include pitch coke, needle coke, and petroleum coke. The fired body of organic polymer compound refers to product carbonized by firing polymer materials such as phenolic resins or furan resins at appropriate temperatures, and some of the products are classified in non-graphitizable carbon or graphitizable carbon. These carbon materials are preferred because the crystal structures produced during charging/discharging undergo little change, thereby making it possible to achieve a high charge/discharge capacity, and making it possible to achieve favorable cycle characteristics. In particular, graphite is preferred because of its large electrochemical equivalent, which allows for the achievement of a high energy density. In addition, non-graphitizable carbon is preferred because excellent cycle characteristics are achieved. Furthermore, materials that are low in charge/discharge potential, specifically materials that are close in charging/discharging potential to lithium metal, are preferred because the materials can easily achieve increases in the energy density of the battery.

In addition, examples of another negative electrode active material capable of increasing the capacity also include a material containing at least one of a metal element and a metalloid element as a constituent element (for example, an alloy, a compound, or a mixture). This is because the use of such a material can achieve a high energy density. In particular, the use together with a carbon material is more preferred because a high energy density can be achieved, and because excellent cycle characteristics can be achieved. It should be understood that, in the present technology, examples of the alloy includes, in addition to alloys composed of two or more metal elements, alloys containing one or more metal elements and one or more metalloid elements. In addition, the alloy may also contain a nonmetallic element. Examples of the compositional structure include a solid solution, a eutectic (eutectic mixture), an intermetallic compound, or a mixture of two or more thereof.

Examples of such a negative electrode active material include, for example, a metal element or a metalloid element capable of forming an alloy with lithium. Specifically, the examples include magnesium, boron, aluminum, titanium, gallium (Ga), indium (In), silicon (Si), germanium (Ge), tin, lead (Pb), bismuth (Bi), cadmium (Cd) silver (Ag), zinc, hafnium (Hf), zirconium, yttrium (Y), palladium (Pd) or platinum (Pt). These may be crystalline or amorphous.

As the negative electrode active material, a material including a metal element or a metalloid element of Group 4B in the short periodic table is preferred, and more preferred is a material containing at least one of silicon and tin as a constituent element. This is because silicon and tin are high in ability to occlude and release lithium, and thus capable of achieving a high energy density. Examples of such a negative electrode active material include: a simple substance, an alloy, or a compound of silicon; a simple substance, an alloy, or a compound of tin; and a material that at least partially has a phase of one, or two or more thereof.

Examples of the alloy of silicon include, for example, an alloy containing, as a second constituent element other than silicon, at least one from the group consisting of tin, nickel, copper, iron, cobalt, manganese, zinc, indium, silver, titanium, germanium, bismuth, antimony (Sb) and chromium. Examples of the alloy of tin include, for example, an alloy containing, as a second constituent element other than tin, at least one from the group consisting of silicon, nickel, copper, iron, cobalt, manganese, zinc, indium, silver, titanium, germanium, bismuth, antimony and chromium.

Examples of the compound of tin or the compound of silicon include, for example, a compound containing oxygen or carbon, and may contain, in addition to tin or silicon, the second constituent element described above.

Above all, as a Sn-based negative electrode active material, a SnCoC-containing material is preferred which contains cobalt, tin, and carbon as constituent elements, where the content of carbon is 9.9 mass % or more and 29.7 mass % or less, and the proportion of cobalt to the total of tin and cobalt is 30% by mass or more and 70% by mass or less. This is because in such a composition range, a high energy density can be achieved, and excellent cycle characteristics can be achieved.

This SnCoC-containing material may further contain other constituent elements, if necessary. The other constituent elements preferably include, for example, silicon, iron, nickel, chromium, indium, niobium, germanium, titanium, molybdenum, aluminum, phosphorus (P), gallium or bismuth, and the material may contain two or more thereof. This is because the capacity or cycle characteristics can be further improved.

It should be understood that this SnCoC-containing material has a phase containing tin, cobalt, and carbon, and this phase preferably has a low crystalline or amorphous structure. In addition, in this SnCoC-containing material, the carbon as a constituent element is preferably at least partially bonded to a metal element or a metalloid element which is another constituent element. This is because, while deterioration of cycle characteristics is believed to be caused by aggregation or crystallization of tin or the like, the carbon is bonded to another element, thereby making it possible to suppress such aggregation or crystallization.

Examples of a measurement method for examining the bonding state of the element include, for example, an X-ray photoelectron spectroscopy (XPS). In accordance with XPS, the peak of the is orbit (C1s) of carbon appears at 284.5 eV, in the case of graphite, in a device calibrated in terms of energy so that the peak of the 4f orbital (Au4f) of a gold atom is obtained at 84.0 eV. In addition, in the case of surface contaminated carbon, the peak appears at 284.8 eV. In contrast, when the carbon element increases in charge density, the peak of C1s appears in a lower range than 284.5 eV, for example, when carbon is bonded to a metal element or a metalloid element. More specifically, when the peak of a synthetic wave of C1s obtained for the SnCoC-containing material appears in a lower range than 284.5 eV, the carbon included in the SnCoC-containing material is at least partially bonded to a metal element or a metalloid element.

It should be understood that in the XPS measurement, for example, the peak of C1s is used for the correction of the energy axis of the spectrum. Typically, surface contaminated carbon is present on the surface, the peak of C1s of surface contaminated carbon is determined to be 284.8 eV, which is regarded as an energy reference. In the XPS measurement, the waveform of the peak of C1s is obtained in a form including the peak of the surface contaminated carbon and the peak of the carbon in the SnCoC-containing material, and thus, the analysis with the use of, for example, commercially available software separates the peak of the surface contaminated carbon from the peak of the carbon in the SnCoC-containing material. In the analysis of the waveform, the position of the main peak present on the lowest binding energy side is determined to be an energy reference (284.8 eV).

Other negative electrode active materials also include, for example, a metal oxide or a polymer compound capable of occluding and releasing lithium. Examples of the metal oxide include, for example, a lithium titanium oxide containing titanium and lithium such as lithium titanate ($Li_4Ti_5O_{12}$), an iron oxide, a ruthenium oxide, or a molybdenum oxide. Examples of the polymer compound include, for example, polyacetylene, polyaniline, or polypyrrole.

As the binder, for example, at least one is used which is selected from resin materials such as polyvinylidene fluoride, polytetrafluoroethylene, polyacrylonitrile, styrene butadiene rubber, and carboxymethyl cellulose, and copolymers mainly composed of the resin materials, and the like. As the conducting agent, the same carbon material as the positive electrode active material layer 21B, or the like can be used.

The separator 23 is intended to separate the positive electrode 21 and the negative electrode 22, thereby allowing passage of lithium ions while preventing short circuits due to the current caused by contact between the both electrodes. The separator 23 is composed of, for example, a porous membrane made from a resin such as polytetrafluoroethylene, polypropylene, or polyethylene, and may be adapted to have a structure obtained by laminating two or more of such porous membranes. Above all, a porous membrane made from polyolefin is preferred because the membrane has an excellent short circuit-prevention effect, and can make an improvement in battery safety by a shutdown effect. In particular, polyethylene is preferred as a material constituting the separator 23, because polyethylene can achieve the shutdown effect within a range of 100° C. or higher and 160° C. or lower, and also has excellent electrochemical stability. Besides, a material can be used which is obtained by copolymerizing or blending a chemically stable resin with polyethylene or polypropylene. Alternatively, the porous membrane may have a structure of three or more layers, where a polypropylene layer, a polyethylene layer, and a polypropylene layer are sequentially laminated.

In addition, for the separator 23, a resin layer may be provided on one or both surfaces of the porous membrane which serves as a base material. The resin layer is a porous matrix resin layer with an inorganic substance supported. Thus, oxidation resistance can be obtained, and deterioration of the separator 23 can be suppressed. For example, polyvinylidene fluoride, hexafluoropropylene (HFP), polytetrafluoroethylene or the like can be used as the matrix resin, and it is also possible to use copolymers thereof according to an embodiment.

Examples of the inorganic substance can include a metal, a semiconductor, or oxides or nitrides thereof. For example, examples of the metal can include aluminum and titanium, and examples of the semiconductor can include silicon and boron. In addition, the inorganic substance preferably has substantially no conductivity and a high heat capacity. This is because when the heat capacity is high, the substance is useful as a heat sink in the case of current heating, thereby making it possible to further suppress thermal runaway of the battery. Examples of such an inorganic substance include oxides or nitrides such as alumina ($Al_2O_3$), boehmite (monohydrate of alumina), talc, boron nitride (BN), aluminum nitride (AlN), titanium dioxide ($TiO_2$), and silicon oxide (SiOx). It is to be noted that the porous film as a base material may contain therein the above-described inorganic substance.

The particle size of the inorganic substance preferably falls within the range of 1 nm to 10 μm. If the particle size is smaller than 1 nm, the inorganic substance is difficult to obtain, and even if the substance is available, the substance is not suitable in terms of cost. If the particle size is larger than 10 μm, the distance between the electrodes is increased, thereby achieving an insufficient amount of active material in a limited space, and thus decreasing the battery capacity.

The resin layer can be formed, for example, as follows. More specifically, a slurry composed of the matrix resin, a solvent, and the inorganic substance is applied onto the base material (porous membrane), passed through a poor solvent of the matrix resin and a good solvent bath of the solvent to cause phase separation, and then dried.

The separator 23 is impregnated with an electrolytic solution which is a liquid electrolyte. The electrolytic solution includes a solvent and an electrolyte salt dissolved in the solvent. In order to improve the battery characteristics, the electrolytic solution may contain known additives.

As the solvent, a cyclic carbonate such as ethylene carbonate or propylene carbonate can be used, and it is preferable to use one of ethylene carbonate and propylene carbonate, particularly, use the both in mixture. This is because cycle characteristics can be improved.

As the solvent, and in addition to the foregoing cyclic carbonate esters, it is preferable to use, in mixture, a chain carbonate such as diethyl carbonate, dimethyl carbonate, ethyl methyl carbonate, or methyl propyl carbonate. This is because high ionic conductivity can be achieved.

The solvent preferably further contains 2,4-difluoroanisole or vinylene carbonate. This is because 2,4-difluoroanisole can improve the discharge capacity, whereas vinylene carbonate can improve cycle characteristics. Therefore, it is preferable to use the foregoing compounds in mixture, because the discharge capacity and cycle characteristics can be improved.

Besides the foregoing, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, or trimethyl phosphate.

It should be understood that compounds in which at least some hydrogen of these nonaqueous solvents is substituted with fluorine may be preferred, because the compounds can sometimes improve the reversibility of the electrode reactions depending on the types of the electrodes to be combined.

Examples of the electrolyte salt include, for example, a lithium salt, and one type of electrolyte salt may be used alone, or two or more types of electrolyte salts may be used in mixture. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxolato-O,O'] lithium borate, lithium bis(oxalate)borate, or LiBr. Above all, $LiPF_6$ is preferred, because $LiPF_6$ can achieve high ionic conductivity and improve cycle characteristics.

In the battery 10 configured as described above, on charging, for example, lithium ions are released from the positive electrode active material layer 21B, and occluded by the negative electrode active material layer 22B through the electrolytic solution. Further, on discharging, for example, lithium ions are released from the negative electrode active material layer 22B, and occluded by the positive electrode active material layer 21B through the electrolytic solution.

Next, an example of a method for manufacturing the battery according to an embodiment of the present technology will be described.

The positive electrode 21 is prepared in the following manner. First, for example, a positive electrode combination is prepared by mixing a positive electrode active material, a conducting agent, and a binder, and this positive electrode combination is dispersed in a solvent such as N-methyl-2-pyrrolidone (NMP), thereby preparing a paste-like positive electrode combination slurry. Next, the positive electrode combination slurry is applied to the positive electrode collector 21A, and subjected to solvent drying, and to compression molding by a roll press machine or the like to form the positive electrode active material layer 21B, thereby forming the positive electrode 21. Next, one or more through holes 21C are formed in the position to serve as a wound-back portion of the positive electrode 21 in the case of winding.

The negative electrode 22 is prepared in the following manner. First, for example, a negative electrode combination is prepared by mixing a negative electrode active material and a binder, and this negative electrode combination is dispersed in a solvent such as N-methyl-2-pyrrolidone, thereby preparing a paste-like negative electrode combination slurry. When a material containing silicon or a material containing a silicon powder and a carbon powder is used as the negative electrode active material, the effect achieved by the isotropic pressing process described later will be significant Next, the negative electrode combination slurry is applied to the negative electrode collector 22A, and subjected to solvent drying, and to compression molding by a roll press machine or the like to form the negative electrode active material layer 22B, thereby preparing the negative electrode 22.

Next, the positive electrode lead 11 is attached by welding to an end of the positive electrode current collector 21A, and the negative electrode lead 12 is attached by welding to an end of the negative electrode current collector 22A. Next, the positive electrode 21 and the negative electrode 22 are laminated with the separator 23 interposed therebetween, thereby providing a stacked body, and this stacked body is wound around a flattened winding core, and wound many times in the longitudinal direction to form the wound electrode body 20. In this regard, the position of winding the stacked body with respect to the flattened winding core is adjusted so that the through hole 21C is positioned at the wound-back portion of the positive electrode 21. Next, an outer circumferential end of the positive electrode 21 as the outermost circumferential electrode is fixed with the winding termination tape 24.

Next, for example, the wound electrode body 20 is sandwiched between the flexible exterior members 30, and housed in the exterior members 30 by heat-sealing the outer circumferential edge excluding one side into a bag shape. In that regard, the adhesive film 31 is inserted between the positive electrode lead 11 and the negative electrode lead 12 and the exterior members 30. Next, an electrolytic solution is prepared, and injected into the exterior member 40 from the side which is not heat-sealed. Next, the side mentioned above is heat-sealed in a vacuum atmosphere to encapsulate the wound electrode body 20. Thus, the battery 10 externally packaged by the exterior member 30 is obtained.

Next, if necessary, the battery 10 is molded by heat pressing. More specifically, the battery 10 is, while applying pressure thereon, heated at a higher temperature than normal temperatures. Next, the battery 10 is subjected to uniaxial pressing, if necessary. For example, the battery 10 is subjected to uniaxial pressing by pressing a pressure plate against the main surface of the battery 10.

The battery 10 according to an embodiment has the through hole 21C in the wound-back portion of the positive electrode 21. Thus, the stress applied to the wound-back portion of the positive electrode 21 can be released by the through hole 21C. Therefore, the wound-back portion of the positive electrode 21 can be kept from being fractured in the fabrication of the battery 10 (for example, in winding the positive electrode 21 or pressing the battery 10).

The negative electrode 22 may have one or more through holes 21C in the wound-back portion according to another embodiment. However, in a common battery, the thickness of the positive electrode is larger as compared with the thickness of the negative electrode, and the positive electrode is more likely to be fractured as compared with the negative electrode, and thus, the positive electrode 21 preferably has the through hole 21C.

The positive electrode 21 may have one or more through holes 21C in the part between the wound-back portions of the positive electrode 21, that is, the flat part of the positive electrode 21. In this case, the density of the through holes 21C in the wound-back portion of the positive electrode 21 (the number of the through holes 21C per unit area) is preferably higher as compared with the density of the through holes 21C in the part between the wound-back portions of the positive electrode 21.

In the embodiment as described herein, an example of applying the present technology to a laminate film-type battery has been described, but the present technology can be applied to any battery as long as the battery includes a wound electrode body with electrodes wound into a flattened shape. For example, the present technology can be also applied to prismatic batteries and the like where a flattened wound electrode body is housed in a prismatic battery can.

Figure 5:
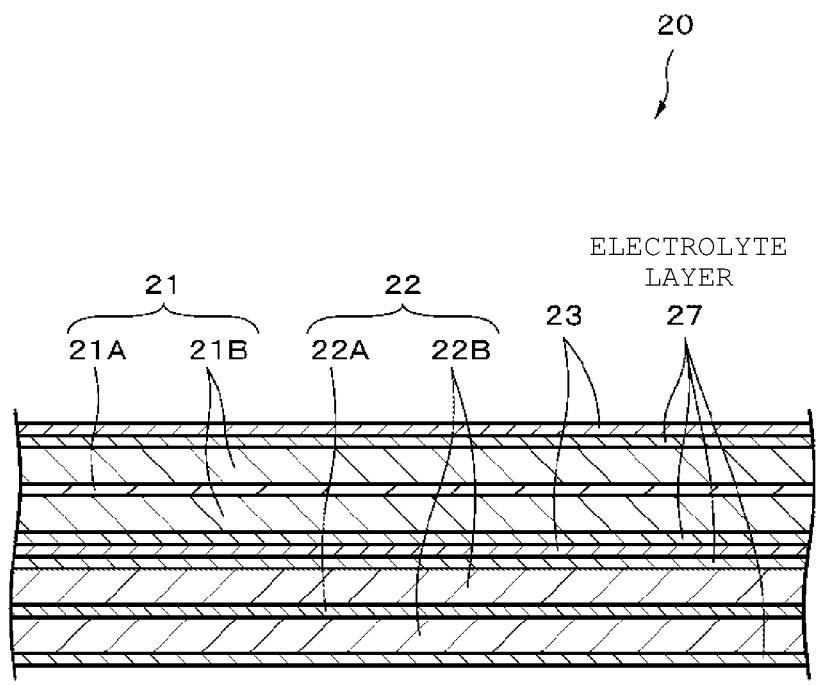
FIG. 5 is an enlarged cross-sectional view illustrating a configuration example of a nonaqueous electrolyte secondary battery according to an embodiment of the present technology.

As shown in FIG. 5, an electrolyte layer 27 may be provided between the negative electrode 22 and the separator 23, and an electrolyte layer 27 may be provided between the positive electrode 21 and the separator 23. The electrolyte layer 27 includes an electrolytic solution, and a polymer compound to serve as a holding body for holding the electrolytic solution, and the polymer compound is swollen by the electrolytic solution. The content ratio of the polymer compound can be adjusted appropriately. In particular, in the case of adopting a gel-like electrolyte, high ionic conductivity can be achieved, and liquid leakage from the battery can be suppressed, which are preferable.

The electrolytic solution is the same as the electrolytic solution according to the first embodiment. Examples of the polymer compound include, for example, polyacrylonitrile, polyvinylidene fluoride, a copolymer of vinylidene fluoride and hexafluoropropylene, polytetrafluoroethylene, polyhexafluoropropylene, a polyethylene oxide, a polypropylene oxide, polyphosphazene, polysiloxane, polyvinyl acetate, polyvinyl alcohol, polymethyl methacrylate, a polyacrylic acid, a polymethacrylic acid, a styrene-butadiene rubber, a nitrile-butadiene rubber, polystyrene, or polycarbonate. In particular, from the viewpoint of electrochemical stability, polyacrylonitrile, polyvinylidene fluoride, polyhexafluoropropylene, or polyethylene oxide is preferred.

It should be understood that the electrolyte layer 27 may include therein the same inorganic substance as described in the explanation of the resin layer for the separator 23 in the first embodiment. This is because the heat resistance can be further improved.

In another embodiment, a battery pack and an electronic device that include the battery according to the embodiments as described herein will be described.

Figure 6:
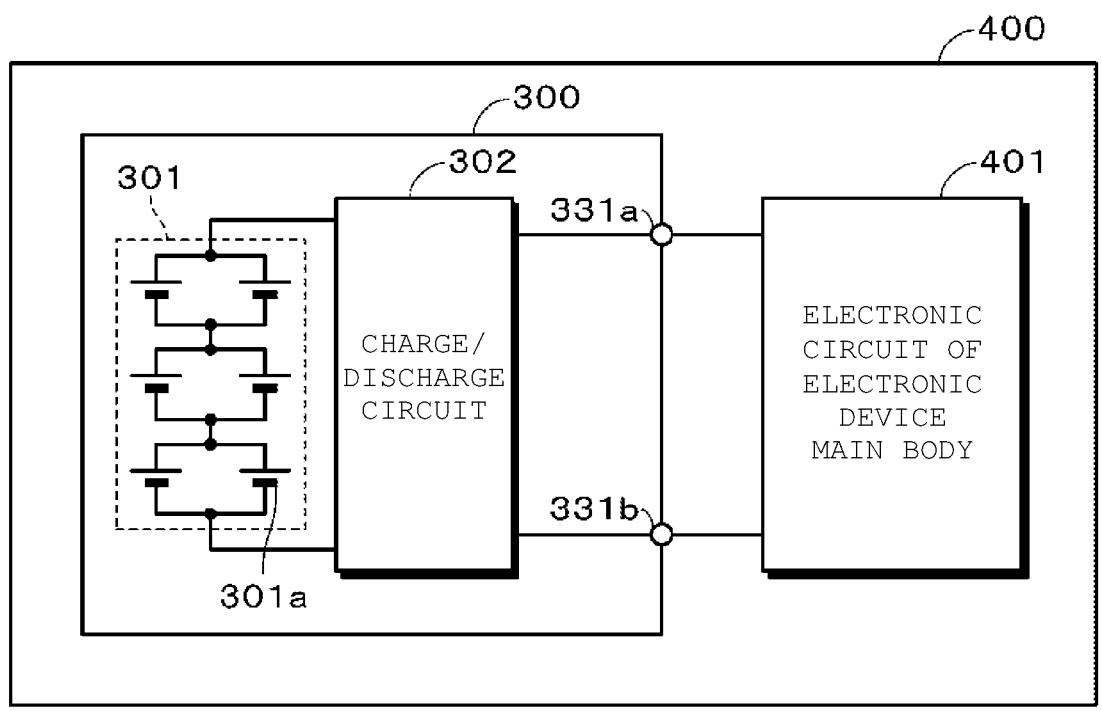
FIG. 6 is a block diagram illustrating a configuration example of an electronic device according to an embodiment of the present technology.

A configuration example of a battery pack 300 and an electronic device 400 according to an embodiment of the present technology will be described below with reference to FIG. 6. The electronic device 400 includes an electronic circuit 401 of an electronic device main body, and the battery pack 300. The battery pack 300 is electrically connected to the electronic circuit 401 via a positive electrode terminal 331a and a negative electrode terminal 331b. The electronic apparatus 400 has, for example, a configuration that allows the user to attach/detach the battery pack 300. It is to be noted that the configuration of the electronic device 400 is not limited thereto, and the battery pack 300 may be configured to be built in the electronic device 400 so that the user is not allowed to remove the battery pack 300 from the electronic device 400.

In the case of charging the battery pack 300, the positive electrode terminal 331a and negative electrode terminal 331b of the battery pack 300 are respectively connected to a positive electrode terminal and a negative electrode terminal of a charger (not shown). On the other hand, in the case of discharging the battery pack 300 (in the case of using the electronic device 400), the positive electrode terminal 331a and negative electrode terminal 331b of the battery pack 300 are respectively connected to a positive electrode terminal and a negative electrode terminal of the electronic circuit 401.

Examples of the electronic device 400 include, but not limited to, notebook personal computers, tablet computers, mobile phones (for example, smartphones), personal digital assistants (Personal Digital Assistants: PDA), display devices (LCD, EL displays, electronic papers, etc.), imaging devices (for example, digital still cameras, digital video cameras, etc.), audio instruments (for example, portable audio players), game machines, cordless phone handsets, electronic books, electronic dictionaries, radios, headphones, navigation systems, memory cards, pacemakers, hearing aids, electric tools, electric shavers, refrigerators, air conditioners, television receivers, stereos, water heaters, microwave ovens, dishwashers, washing machines, driers, lighting devices, toys, medical devices, robots, road conditioners, and traffic lights.

The electronic circuit 401 includes, for example, a CPU, a peripheral logic unit, an interface unit, a storage unit, and the like, and controls the overall electronic device 400.

The battery pack 300 includes an assembled battery 301 and a charge/discharge circuit 302. The assembled battery 301 is configured to have a plurality of secondary batteries 301a connected in series and/or in parallel. The plurality of secondary batteries 301a are connected so as to arrange, for example, n batteries in parallel and m batteries in serial (n and m are positive integers). It should be understood that FIG. 6 shows therein an example where six secondary batteries 301a are connected so as to arrange two batteries in parallel and three batteries in series (2P3S). The battery according to the embodiment as described herein is used as the secondary battery 301a.

The charge/discharge circuit 302 is a control circuit including a processor that controls charging/discharging the assembled battery 301. Specifically, in the case of charging, the charge/discharge circuit 302 controls charging the assembled battery 301. On the other hand, in the case of discharging (that is, in the case of using the electronic device 400), the charge/discharge circuit 302 controls discharging the electronic device 400.

In the embodiment described herein, the case where the battery pack 300 includes the assembled battery 301 composed of the plurality of secondary batteries 301a has been described as an example, but a configuration may be adopted where the battery pack 300 includes a single secondary battery 301a in place of the assembled battery 301.

In another embodiment, an electric storage system including the battery according to the embodiment as described herein in an electric storage device will be described. This electric storage system may be any system, including mere electric power devices, so long as the system is intended to use generally electric power. This electric power system includes, for example, a smart grid, a home energy management system (HEMS), and a vehicle, which are also capable of electricity storage.

Figure 7:
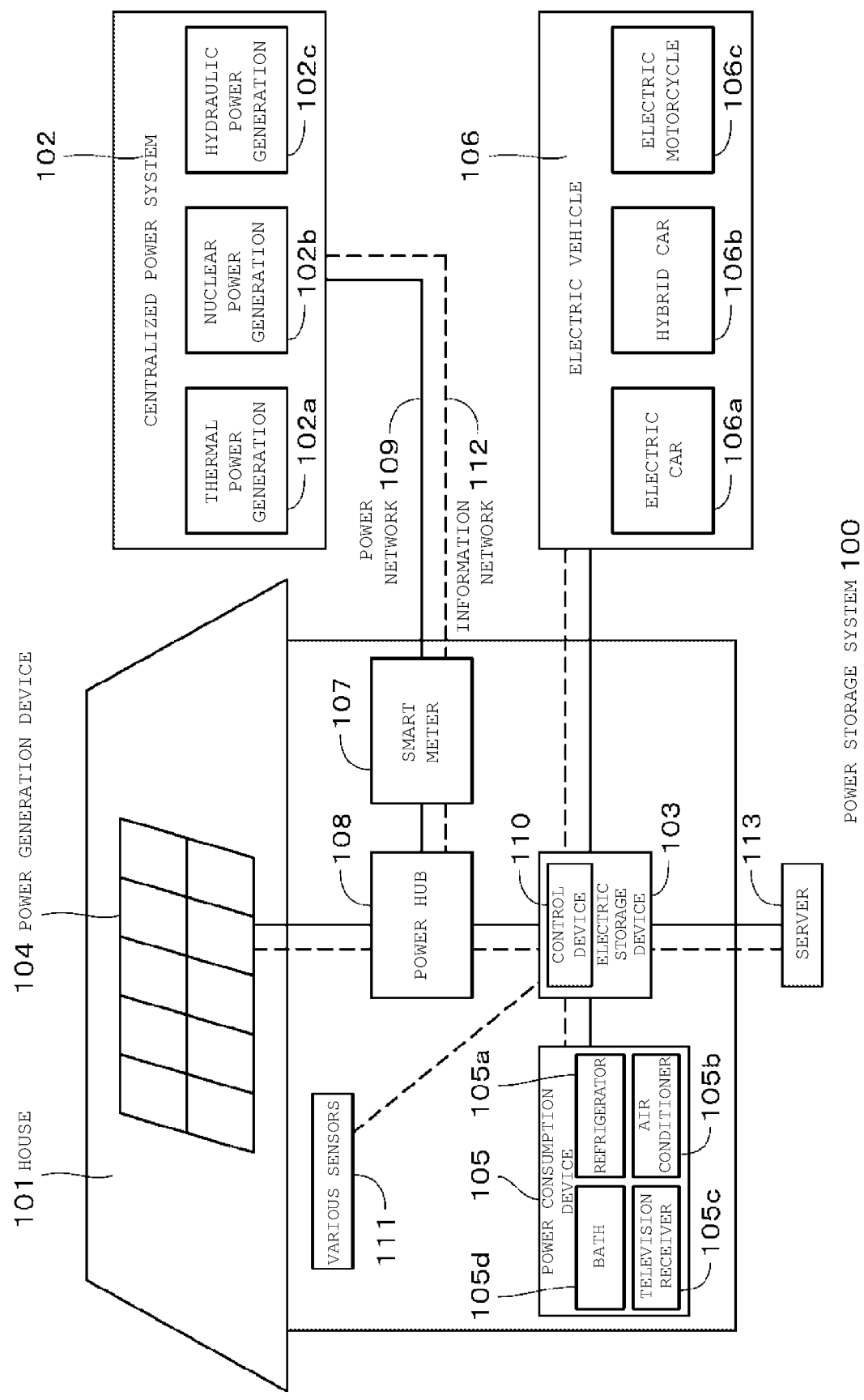
FIG. 7 is a schematic diagram illustrating a configuration example of an electric storage system according to another of the present technology.

A configuration example of an electric storage system (electric power system) 100 according to another embodiment will be described below with reference to FIG. 7. This electric storage system 100 is an electric storage system for residential use, where electric power is supplied to an electric storage device 103 via a power network 109, an information network 112, a smart meter 107, a power hub 108, and the like, from a centralized power system 102 such as a thermal power generation 102a, a nuclear power generation 102b, and a hydraulic power generation 102c. At the same time, electric power is supplied to the electric storage device 103 from an independent power source such as a home power generation device 104. The electric power supplied to the electric storage device 103 is stored. Electric power for use in a house 101 is supplied through the use of the electric storage device 103. The same electric storage system can be used not only for the house 101 but also for buildings.

The house 101 is provided with the home power generation device 104, a power consumption device 105, the electric storage device 103, a control device 110 for controlling the respective devices, the smart meter 107, the power hub 108, and sensors 111 for acquiring various types of information. The respective devices are connected by the power network 109 and the information network 112. As the home power generation device 104, a solar cell, a fuel cell, or the like is used, and electric power generated is supplied to the power consumption device 105 and/or the electric storage device 103. The power consumption device 105 refers to a refrigerator 105a, an air conditioner 105b, a television receiver 105c, a bath 105d, and the like. Furthermore, the power consumption device 105 includes an electric vehicle 106. The electric vehicle 106 refers to an electric car 106a, a hybrid car 106b, an electric motorcycle 106c, and the like.

The electric storage device 103 includes the battery according to the first embodiment or the modification example thereof. The smart meter 107 has the function of measuring the commercial power usage and transmitting the measured usage to the electric power company. The power network 109 may be any one or combination of direct-current power feeding, alternate-current power feed, and contactless power feeding.

The various sensors 111 are, for example, a human sensor, an illuminance sensor, an object detection sensor, a power consumption sensor, a vibration sensor, a contact sensor, a temperature sensor, an infrared sensor, and the like. Information acquired by the various sensors 111 is transmitted to the control device 110. With the information from the sensor 111, weather condition, the human condition, etc. can be grasped to control the power consumption device 105 automatically controlled, and thus minimize the energy consumption. Furthermore, the control device 110 can transmit information on the house 101 to an external electric power company or the like via the Internet.

The power hub 108 performs processing such as power line branching and DC/AC conversion. Examples of the communication method of the information network 112 connected to the control device 110 include a method of using a communication interface such as a UART (Universal Asynchronous Receiver-Transceiver: transmission/reception circuit for asynchronous serial communication), and a method of using a sensor network in accordance with a wireless communication standard, such as Bluetooth (registered trademark), ZigBee, and Wi-Fi. The Bluetooth (registered trademark) system, which is applied to multimedia communication, can perform one-to-many connection communication. The ZigBee uses the physical layer of the IEEE (Institute of Electrical and Electronics Engineers) 802.15.4. The IEEE 802.15.4 is a name of a short range wireless network standard referred to as PAN (Personal Area Network) or W (Wireless) PAN.

The control device 110 is connected to an external server 113 according to an embodiment. This server 113 may be managed by any of the house 101, an electric power company, or a service provider. The information transmitted and received by the server 113 is, for example, power consumption information, life pattern information, power charges, weather information, natural disaster information, and information on electric power trade. These pieces of information may be transmitted and received from a power consumption device (for example, a television receiver) in the home, but may be transmitted and received from a device outside the home (for example, a mobile phone). These pieces of information may be displayed on a device that has a display function, for example, a television receiver, a mobile phone, a PDA (Personal Digital Assistants), or the like.

The control device 110 that controls each unit is composed of a CPU (Central Processing Unit), a RAM (Random Access Memory), a ROM (Read Only Memory), and the like, and stored in the electric storage device 103 in this example. The control device 110 connected to the electric storage device 103, the home power generation device 104, the power consumption device 105, the various sensors 111, the server 113 via the information network 112, has the function of regulating, for example, the commercial power usage and the power generation. Further, the device may have a function such as handling a power trade in the power market.

As described herein, the electric storage device 103 can store therein electric power generated by not only the centralized power system 102 such as the thermal power generation 102a, the nuclear power generation 102b, and the hydraulic power generation 102c, but also the home power generation device 104 (solar power generation, wind power generation). Therefore, even if the home power generation device 104 fluctuates in generated power, it is possible to achieve control such as making the amount of power sent to the outside constant or discharging the power as needed. For example, the system can be also used such that electric power obtained by solar power generation is stored in the electric storage device 103, and at night, night-time power at a lower rate is stored in the electric storage device 103, and then, the power stored by the electric storage device 103 is discharged and used in the daytime at a higher rate.

It should be understood that while an example of the control device 110 stored in the electric storage device 103 has been described in this example, the control device 110 may be stored in the smart meter 107, or may be configured alone. Furthermore, the electric storage system 100 may be used for multiple homes in multiple dwelling houses, or may be used for multiple detached houses.

In another embodiment, an electric vehicle including the battery according to the embodiment as described herein will be described.

Figure 8:
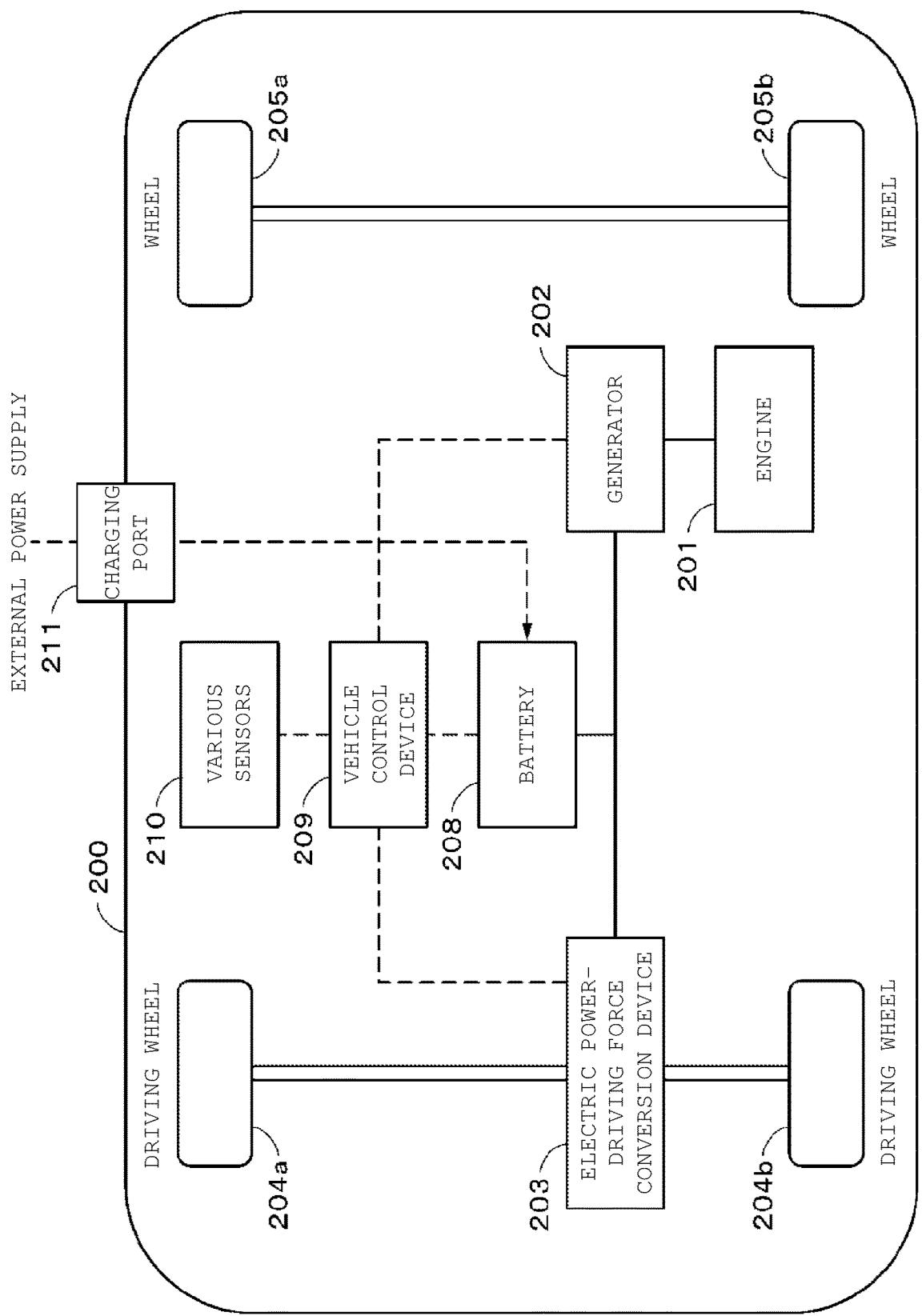
FIG. 8 is a schematic diagram illustrating a configuration of an electric vehicle according to another embodiment of the present technology.

A configuration of an electric vehicle according to another embodiment of the present technology will be described with reference to FIG. 8. This hybrid vehicle 200 is a hybrid vehicle that employs a series hybrid system. The series hybrid system is intended for a vehicle that runs on an electric power-driving force conversion device 203, with the use of electric power generated by a generator driven by an engine, or the electric power stored once in the battery.

The hybrid vehicle 200 carries an engine 201, a generator 202, the electric power-driving force conversion device 203, a driving wheel 204a, a driving wheel 204b, a wheel 205a, a wheel 205b, a battery 208, a vehicle control device 209, various sensors 210, and a charging port 211. The battery according to the first embodiment or the modified example thereof is used as the battery 208.

The hybrid vehicle 200 travels with the electric power-driving force conversion device 203 as a power source. An example of the electric power-driving force conversion device 203 is a motor. The electric power-driving force conversion device 203 is operated by the electric power of the battery 208, and the torque of the electric power-driving force conversion device 203 is transmitted to the driving wheels 204a and 204b. It is to be noted that the electric power-driving force conversion device 203 can be applied to both an alternate-current motor and a direct-current motor by using direct current-alternate current (DC-AC) or reverse conversion (AC-DC conversion) in a required location. The various sensors 210 control the engine rotation speed via the vehicle control device 209, and control the position (throttle position) of a throttle valve, not shown. The various sensors 210 include a speed sensor, an acceleration sensor, an engine rotation speed sensor, and the like.

The torque of the engine 201 is transmitted to the generator 202, and the torque makes it possible to reserve, in the battery 208, the electric power generated by the generator 202.

When the hybrid vehicle 200 is decelerated by a braking mechanism, not shown, the resistance force during the deceleration is applied as torque to the electric power-driving force conversion device 203, and the regenerative electric power generated by the electric power-driving force conversion device 203 is reserved in the battery 208 by the torque.

The battery 208 is connected to a power source outside the hybrid vehicle 200 via the charge port 211, thereby making it also possible to receive electric power supply from the external power supply with the charging port 211 as an input port, and then reserve the received power.

Although not shown, the vehicle may be provided with an information processing device that performs information processing related to vehicle control, based on information on the battery. Examples of such an information processing device include, for example, an information processing device that displays the remaining battery level, based on information on the remaining level of the battery.

It should be understood that as an example, the series hybrid vehicle has been described above, which runs on the motor with the use of the electric power generated by the generator driven by the engine, or the electric power stored once in the battery. However, the present technology can be also effectively applied to parallel hybrid vehicles which use the outputs of both an engine and a motor as a driving source, and appropriately switch three systems of running on only the engine, running on only the motor, and running on the engine and the motor. Furthermore, the present technology can be also effectively applied to so-called electric vehicles that run on driving by only a driving motor without using any engine.

EXAMPLES

Hereinafter, the present technology will be specifically described with reference to examples, but the present technology is not to be considered limited to only these examples.

The area density of the positive electrode active material layer, the volume density of the positive electrode active material layer, the hole diameter of the through hole, and the occupancy rate of the through hole in the following examples and reference examples are determined by the methods described in the first embodiment.

Examples 1 to 8, Reference Examples 5 to 7

A positive electrode was prepared as follows according to an embodiment. First, lithium carbonate ($Li_2CO_3$) and cobalt carbonate ($CoCO_3$) were mixed at a molar ratio of 0.5:1, and then subjected to firing in air at 900° C. for 5 hours, thereby providing a lithium cobalt composite oxide ($LiCoO_2$). Next, 91 parts by mass of the lithium cobalt composite oxide obtained in the way described above, 6 parts by mass of graphite as a conducting agent, and 3 parts by mass of polyvinylidene fluoride as a binder were mixed, thereby providing a positive electrode combination, and the positive electrode combination was then dispersed in N-methyl-2-pyrrolidone to provide a paste-like positive electrode combination slurry.

Next, the positive electrode combination slurry was applied to both surfaces of a positive electrode current collector made from strip-shaped aluminum foil (12 μm thick), dried, and then subjected to compression molding by a roll press machine, thereby forming a positive electrode active material layer. In this regard, the thickness of the positive electrode combination slurry applied and the pressing pressure were adjusted so that the area density and volume density of the positive electrode active material layer reached the values shown in Table 1. Next, at a position corresponding to the first wound-back portion of the positive electrode active material layer of the positive electrode, a circular through hole was formed so as have the number of through holes and hole size (diameter) shown in Table 1. In this regard, when the number of through holes was more than one, a plurality of through holes was formed so as to be arranged in a row at equal intervals in the lateral direction (width direction) of the positive electrode 21. Next, a positive electrode lead made of aluminum was attached by welding to one end of the positive electrode current collector.

A negative electrode was prepared as follows. First, 97 parts by mass of an artificial graphite powder as a negative electrode active material and 3 parts by mass of polyvinylidene fluoride as a binder were mixed to provide a negative electrode combination, and the negative electrode combination was dispersed in N-methyl-2-pyrrolidone to provide a paste-like negative electrode combination slurry. Next, the negative electrode combination slurry was applied to both surfaces of a negative electrode current collector made from strip-shaped copper foil (15 μm thick), dried, and then subjected to compression molding by a roll press machine, thereby forming a negative electrode active material layer. Next, a negative electrode lead made of nickel was attached to one end of the negative electrode current collector.

A laminate-type battery was prepared as follows. First, the prepared positive electrode and negative electrode were attached firmly with a separator composed of a microporous polyethylene film with a thickness of 25 μm, wound in a longitudinal direction with the use of a flattened winding core, and a winding termination tape was attached to the outermost circumferential part, thereby forming a flattened wound electrode body. In this regard, the winding of the positive electrode was adjusted so that the through hole was positioned at the position corresponding to the first wound-back portion of the positive electrode active material layer of the positive electrode. Next, the wound electrode body was loaded between exterior members, and three sides of the exterior members were heat-sealed, while the other side was not heat-sealed so as to have an opening. Moistureproof aluminum laminate films with a 25 μm thick nylon film, 40 μm thick aluminum foil, and a 30 μm thick polypropylene film laminated in order from the outermost layer were used as the exterior members.

First, a mixed solvent was prepared by mixing ethylene carbonate (EC) and propylene carbonate (PC) so that the ratios by mass satisfied EC:PC=1:1. Next, an electrolytic solution was prepared by dissolving, in the mixed solvent, lithium hexafluorophosphate ($LiPF_6$) as an electrolyte salt so as to reach 1.0 mol/kg. This electrolytic solution was injected from the opening of the exterior members, the remaining side of the exterior members was heat-sealed under reduced pressure, and thus hermetically sealed. Next, the encapsulated wound electrode body was heated while applying pressure on the wound electrode body, thereby integrating the positive electrode, negative electrode, and separator constituting the battery element. Thus, an intended laminate-type battery was obtained.

Reference Examples 1 to 4

The thickness of the positive electrode combination slurry applied and the pressing pressure were adjusted so that the area density and volume density of the positive electrode active material layer reached the values shown in Table 1. In addition, no through hole was formed in the positive electrode. A laminate-type battery was obtained in the same manner as in Example 1 except for the foregoing.

The batteries obtained as described herein were evaluated as follows according to an embodiment.

First, the battery was charged and discharged for 1 cycle in an ambient temperature environment (23° C.). In the case of charging, the battery was charged with a current of 1C until the voltage reached 4.2 V, and then charged at a voltage of 4.2 V until the current reached 0.05C. In the case of discharging, the battery was discharged with a current of 1C until the voltage reached 3.0 V. It is to be noted that the term "1C" refers to a current value for fully discharging the battery capacity (theoretical capacity) in 1 hour, whereas the term "0.05C" refers to a current value for fully discharging the battery capacity in 20 hours. Next, the battery was disassembled, the positive electrode was removed, and the presence or absence of any fracture was visually confirmed.

First, the battery was charged and discharged for 200 cycles in an ambient temperature environment (23° C.). It is to be noted that the charge/discharge conditions were made in the same way as in the evaluation of "Presence or Absence of Fracture in Preparation of Battery". Next, the battery was disassembled, the positive electrode was removed, and the presence or absence of any fracture was visually confirmed.

Table 1 shows the evaluation results for the batteries according to Examples 1 to 8 and Reference Examples 1 to 7.

TABLE 1

| | Positive Electrode | | | | | Evaluation | |
|---|---|---|---|---|---|---|---|
| | Active Material Layer | | Through Hole | | | Presence or Absence of Fracture in Preparation of Battery | Presence or Absence of Fracture after Cycle Test |
| | Area Density [mg/cm$^2$] | Volume Density [g/cm$^3$] | Number of Through Holes [—] | Hole Diameter [μm] | Occupancy Rate [%] | | |
| Example 1 | 39 | 4.1 | 15 | 1500 | 23.68 | No | No |
| Example 2 | 60 | 4.2 | 15 | 1500 | 23.68 | No | No |
| Example 3 | 60 | 4.2 | 7 | 1500 | 11.05 | No | No |
| Example 4 | 60 | 4.2 | 15 | 800 | 12.63 | No | No |
| Example 5 | 60 | 4.2 | 15 | 5 | 0.08 | No | No |

TABLE 1-continued

| | Positive Electrode Active Material Layer | | Through Hole | | | Evaluation | |
|---|---|---|---|---|---|---|---|
| | Area Density [mg/cm$^2$] | Volume Density [g/cm$^3$] | Number of Through Holes [—] | Hole Diameter [µm] | Occupancy Rate [%] | Presence or Absence of Fracture in Preparation of Battery | Presence or Absence of Fracture after Cycle Test |
| Example 6 | 60 | 4.2 | 16 | 1500 | 25.26 | No | Yes |
| Example 7 | 60 | 4.2 | 1 | 1600 | 1.68 | No | Yes |
| Example 8 | 60 | 3.2 | 1 | 5 | 0.01 | No | No |
| Reference Example 1 | 60 | 4.2 | 0 | — | — | Yes (totally fractured) | — |
| Reference Example 2 | 27 | 4.2 | 0 | — | — | No | No |
| Reference Example 3 | 39 | 4.1 | 0 | — | — | Yes (totally fractured) | — |
| Reference Example 4 | 60 | 3.0 | 0 | — | — | No | No |
| Reference Example 5 | 60 | 4.31 | 15 | 5 | 0.08 | Yes (totally fractured) | — |
| Reference Example 6 | 60 | 4.31 | 1 | 5 | 0.01 | Yes (totally fractured) | — |
| Reference Example 7 | 65 | 4.1 | 7 | 1500 | 11.05 | Yes (totally fractured) | — |

From Table 1, the following is determined.

The battery where the area density of the positive electrode active material layer is more than 27 mg/cm$^2$ and less than 65 mg/cm$^2$, and the volume density of the positive electrode active material layer is more than 3.0 g/cm$^3$ and 4.30 g/cm$^3$ or less, with the through holes provided in the wound-back portion of the positive electrode, can keep the wound-back portion of the positive electrode from being fractured in the preparation of the battery (Examples 1 to 8, Reference Examples 1 and 3).

On the other hand, the battery where the area density of the positive electrode active material layer is 27 mg/cm$^2$ or less, or the volume density of the positive electrode active material layer is 3.0 g/cm$^3$ or less can, even without any through hole provided in the positive electrode, keep the wound-back portion of the positive electrode from being fractured in the preparation of the positive electrode (Reference Examples 2 and 4). In addition, the battery where the area density of the positive electrode active material layer is 65 mg/cm$^2$ or more, or the volume density of the positive electrode active material layer exceeds 4.30 g/cm$^3$ has, even if a through hole is provided in the positive electrode, and even if the number of through holes is increased, difficulty keeping the wound-back portion of the positive electrode from being fractured in the preparation of the battery (Reference Examples 5 to 7).

The battery where the area density of the positive electrode active material layer is more than 27 mg/cm$^2$ and less than 65 mg/cm$^2$, and the volume density of the positive electrode active material layer is more than 3.0 g/cm$^3$ and 4.30 g/cm$^3$ or less can, with the number of through holes being 15 or less, suppress fracture of the positive electrode, which is generated in the wound-back portion when a charge/discharge cycle is repeated (Examples 2 and 6).

The battery where the area density and volume density of the positive electrode active material layer fall within the ranges mentioned above can, with the hole size of the through hole being 1500 µm or less, suppress fracture of the positive electrode, which is generated in the rewound part when a charge/discharge cycle is repeated (Examples 2, 3, and 7).

The battery where the area density and volume density of the positive electrode active material layer fall within the ranges mentioned above can, with the occupancy rate of the through holes being 24% or less, suppress fracture of the positive electrode, which is generated in the rewound part when a charge/discharge cycle is repeated (Examples 2 to 7).

While the embodiments of the present technology as well as the examples have been concretely described herein, the present technology is not to be considered limited to the embodiments, modifications thereof, and examples described above, and it is possible to make various modifications based on technical idea of the present technology.

For example, the configurations, methods, steps, shapes, materials, numerical values, and the like cited in the above-described embodiments, modification examples thereof, and the examples are considered by way of example only, and configurations, methods, steps, shapes, materials, and numerical values may be used which are different from the foregoing, if necessary.

Further, the configurations, methods, steps, shapes, materials, numerical values, and the like in the above-described embodiments, modification examples thereof, and the examples can be combined with each other, without departing from the scope of the present technology.

Further, while the example where the present technology is applied to the lithium ion secondary battery has been described in the above-described embodiments, the present technology can be also applied to secondary batteries other than lithium ion secondary batteries, and primary batteries. However, it is particularly effective to apply the present technology to lithium ion secondary batteries.

The present technology is described below in further detail according to an embodiment.

(1)

A battery including an electrode wound in a flattened shape, where the electrode has a through hole in a rewound part.

(2)

The battery according to (1), where the electrode includes a current collector and an active material layer, and the rewound part is a rewound part of a section where the active material layer is provided on the current collector.

(3)

The battery according to (1) or (2), where the electrode is a positive electrode.

(4)

The battery according to (3), where the positive electrode includes a current collector and a positive electrode active material layer, and the area density of the positive electrode active material layer in a section where the positive electrode active material layer is provided on both surfaces of the current collector is more than 27 mg/cm$^2$ and less than 65 mg/cm$^2$.

(5)

The battery according to (3) or (4), where the positive electrode includes a positive electrode active material layer, and the volume density of the positive electrode active material layer is more than 3.0 g/cm$^3$ and 4.30 g/cm$^3$ or less.

(6)

The battery according to any of (1) to (5), where the number of through holes provided in the rewound part is 1 or more and 15 or less.

(7)

The battery according to any of (1) to (6), where the through hole has a hole diameter of 5 mm or more and 1500 μm or less.

(8)

The battery according to any of (1) to (7), where the occupancy rate of the through hole in the lateral direction of the electrode is more than 0% and 24% or less.

(9)

The battery according to any of (1) to (8), where the through hole is provided in the innermost circumferential rewound part of the active material layer of the electrode.

(10)

The battery according to any of (1) to (9), where the through hole is further provided in a second turn of rewound part of the active material layer of the electrode.

(11)

The battery according to any of (1) to (10), where the through hole is provided in a first rewound part of the active material layer of the electrode.

(12)

The battery according to any of (1) to (11), where the electrode also has a through hole between rewound parts, and the through hole density in the rewound part of the electrode is higher as compared with the through hole density between the rewound parts.

(13)

A battery pack including the battery according to any of (1) to (12), and a control unit that controls the battery.

(14)

An electronic device including the battery according to any of (1) to (12), where the device receives power supply from the battery.

(15)

An electric vehicle including the battery according to any of (1) to (12), a conversion device that receives power supply from the battery to convert the power to a driving force for the vehicle, and a control device that performs information processing related to vehicle control, based on information on the battery.

(16)

An electric storage device including the battery according to any of (1) to (12), where the device supplies electric power to an electronic device connected to the battery.

(17)

The electric storage device according to (16), including a power information control device that transmits and receives a signal to and from another device via a network, where the electric storage device controls charging/discharging the battery, based on the information received by the power information control device.

(18)

A power system including the battery according to any of (1) to (12), where the system receives power supply from the battery.

(19)

The power system according to (18), where power is supplied to the battery from a power generation device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery, comprising:
a positive electrode having a plurality of flat parts and a plurality of wound-back portions,
wherein one or more through holes are provided only in one of the plurality of wound-back portions at an innermost circumference of the plurality of wound-back portions of the positive electrode,
wherein the positive electrode includes a current collector and an active material layer,
the wound-back portions are a curved part of the positive electrode, and
the active material layer is provided on the current collector, and
wherein the one or more through holes are provided in the active material layer of the one of the plurality of wound-back portions at the innermost circumference of the plurality of wound-back portions of the positive electrode.

2. The battery according to claim 1, wherein the one or more through holes are provided in a top surface of the active material layer of the one of the plurality of wound-back portions at the innermost circumference of the plurality of wound-back portions of the positive electrode.

3. The battery according to claim 1, wherein
an area density of the positive electrode active material layer is more than 27 mg/cm$^2$ and less than 65 mg/cm$^2$.

4. The battery according to claim 1, wherein
a volume density of the positive electrode active material layer is from 3.0 g/cm$^3$ to 4.30 g/cm$^3$.

5. The battery according to claim 1, wherein a number of the one or more through holes is 1 or more and 15 or less.

6. The battery according to claim 1, wherein the one or more through holes have a hole diameter of 5 μm or more and 1500 μm or less.

7. The battery according to claim 1, wherein an occupancy rate of the one or more through holes in a lateral direction of the electrode is more than 0% and 24% or less.

8. A battery pack comprising the battery according to claim 1, and a control circuit configured to control the battery.

9. An electronic device comprising the battery according to claim 1, wherein the device is configured to receive power supply from the battery.

10. An electric vehicle comprising:
the battery according to claim 1;
a conversion device configured to receive power supply from the battery to convert the power to a driving force for the vehicle; and
a control device configured to perform information processing related to vehicle control, based on information on the battery.

11. An electric storage device comprising the battery according to claim 1, wherein the device is configured to supply power to an electronic device connected to the battery.

12. The electric storage device according to claim 11, comprising a power information control device configured to transmit and receive a signal to and from another device via a network, wherein the electric storage device is configured to control charging/discharging the battery, based on the information received by the power information control device.

13. A power system comprising the battery according to claim 1, wherein the power system is configured to receive power supply from the battery.

14. The power system according to claim 13, wherein power is supplied to the battery from a power generation device or a power network.

* * * * *